(12) United States Patent
Lien et al.

(10) Patent No.: US 11,513,388 B2
(45) Date of Patent: Nov. 29, 2022

(54) OPTICAL ASSEMBLY AND DISPLAY DEVICE

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Chih-Hsien Lien, Guangdong (CN); Si-Jun Zeng, Guangdong (CN); Tong Shu, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli County (TW)

( * ) Notice: Subject to any disclaimer, the term of this patent is extended or adjusted under 35 U.S.C. 154(b) by 324 days.

(21) Appl. No.: 17/019,376

(22) Filed: Sep. 14, 2020

(65) Prior Publication Data

US 2022/0050324 A1    Feb. 17, 2022

(30) Foreign Application Priority Data

Aug. 13, 2020  (CN) .......................... 202010812378.7

(51) Int. Cl.
| G02F 1/13357 | (2006.01) |
| G02F 1/1335 | (2006.01) |
| G02B 5/02 | (2006.01) |

(52) U.S. Cl.
CPC ..... *G02F 1/133603* (2013.01); *G02B 5/0231* (2013.01); *G02F 1/133607* (2021.01); *G02F 1/133611* (2013.01); *G02F 1/133614* (2021.01)

(58) Field of Classification Search
CPC ............ G02B 5/0231; G02F 1/133607; G02F 1/133611
USPC ....................................... 349/62–64
See application file for complete search history.

(56) References Cited

U.S. PATENT DOCUMENTS 11,333,820 B2 *   5/2022   Cheng .................. G02B 6/0051

* cited by examiner

*Primary Examiner* — Charles S Chang
(74) *Attorney, Agent, or Firm* — CKC & Partners Co., LLC

(57) ABSTRACT

An optical assembly includes a first optical film and a second optical film. The first optical film includes first microstructures arranged in a chessboard arrangement based on a first direction. The second optical film includes second microstructures arranged in a chessboard arrangement based on a second direction. The angle between the first direction and the second direction is greater than or equal to 30 degrees and less than or equal to 60 degrees.

18 Claims, 10 Drawing Sheets

OPTICAL ASSEMBLY AND DISPLAY DEVICE

RELATED APPLICATIONS

This application claims priority to China Application Serial Number 202010812378.7 filed Aug. 13, 2020, which is herein incorporated by reference.

BACKGROUND

Field of Invention

The present invention relates to an optical assembly to reduce an uneven brightness phenomenon (i.e. mura defect).

Description of Related Art

In a conventional backlight module, a light source is disposed with multiple optical films such as a prism layer, a diffusion layer, and a light guide plate. Some optical films may have microstructures. When the microstructures of an upper optical film and a lower optical film are the same (e.g. with repeated stripes), a moire pattern occurs and results in uneven brightness. How to solve this problem is an issue of concern to those skilled in the art.

SUMMARY

Embodiments of the present disclosure provide an optical assembly including a first optical film and a second optical film. The first optical film has multiple first microstructures which are arranged in a chessboard arrangement based on a first direction. The second optical film has multiple second microstructures which are arranged in the chessboard arrangement based on a second direction. An angle between the first direction and the second direction is greater than or equal to 30 degrees and less than or equal to 60 degrees.

In some embodiments, each of the first microstructures has a first protruding structure, and a first angle is formed between two inclined surfaces of the first protruding structure. Each of the second microstructures has a second protruding structure, a second angle is formed between two inclined surfaces of the second protruding structure. The second angle is equal to the first angle.

In some embodiments, the first optical film includes a first substrate, and the first protruding structure is formed on the first substrate. The second optical film includes a second substrate, and the second protruding structure is formed on the second substrate. A first height of the first protruding structure plus the first substrate is equal to a second height of the second protruding structure plus the second substrate.

In some embodiments, the optical assembly further includes: a third optical film disposed above the second optical film in which an angle between the third optical film and the first optical film is equal to 0 degree; a fourth optical film disposed above the third optical film in which an angle between the fourth optical film and the first optical film is equal to 45 degrees; a fifth optical film disposed above the fourth optical film in which an angle between the fifth optical film and the first optical film is equal to 105 degrees; and a sixth optical film disposed above the fifth optical film in which an angle between the sixth optical film and the first optical film is equal to 15 degrees.

In some embodiments, the fourth optical film includes a blue light filter and a color conversion layer including phosphorescent particles. The color conversion layer is disposed above the blue light filter.

In some embodiments, the fourth optical film further includes a film having a substrate and a two-dimensional microstructure. The color conversion layer is disposed between the blue light filter and the film.

In some embodiments, the third optical film includes a third protruding structure and a third substrate, and the third protruding structure is formed on the third substrate. A third height of the third protruding structure plus the third substrate is less than the first height.

From another aspect, embodiments of the present disclosure provide a display device including a light source and an optical assembly. The optical assembly includes a first optical film and a second optical film. The first optical film has multiple first microstructures which are arranged in a chessboard arrangement based on a first direction. The second optical film has multiple second microstructures which are arranged in the chessboard arrangement based on a second direction. An angle between the first direction and the second direction is greater than or equal to 30 degrees and less than or equal to 60 degrees.

In some embodiments, the light source includes multiple light emitting diodes with a light emitting direction toward the optical assembly.

In some embodiments, a size of the light emitting diodes is in a range from 75 micrometers to 300 micrometers, and the light emitting diodes include a sapphire substrate.

In some embodiments, the display device further includes a light control film disposed between the light source and the optical assembly.

In some embodiments, an angle between the first optical film and a horizontal direction of the display device is greater than 0 degree and less than or equal to 45 degrees.

In the display device and the optical assembly, the mura defect can be avoided by rotating one optical film.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1A:
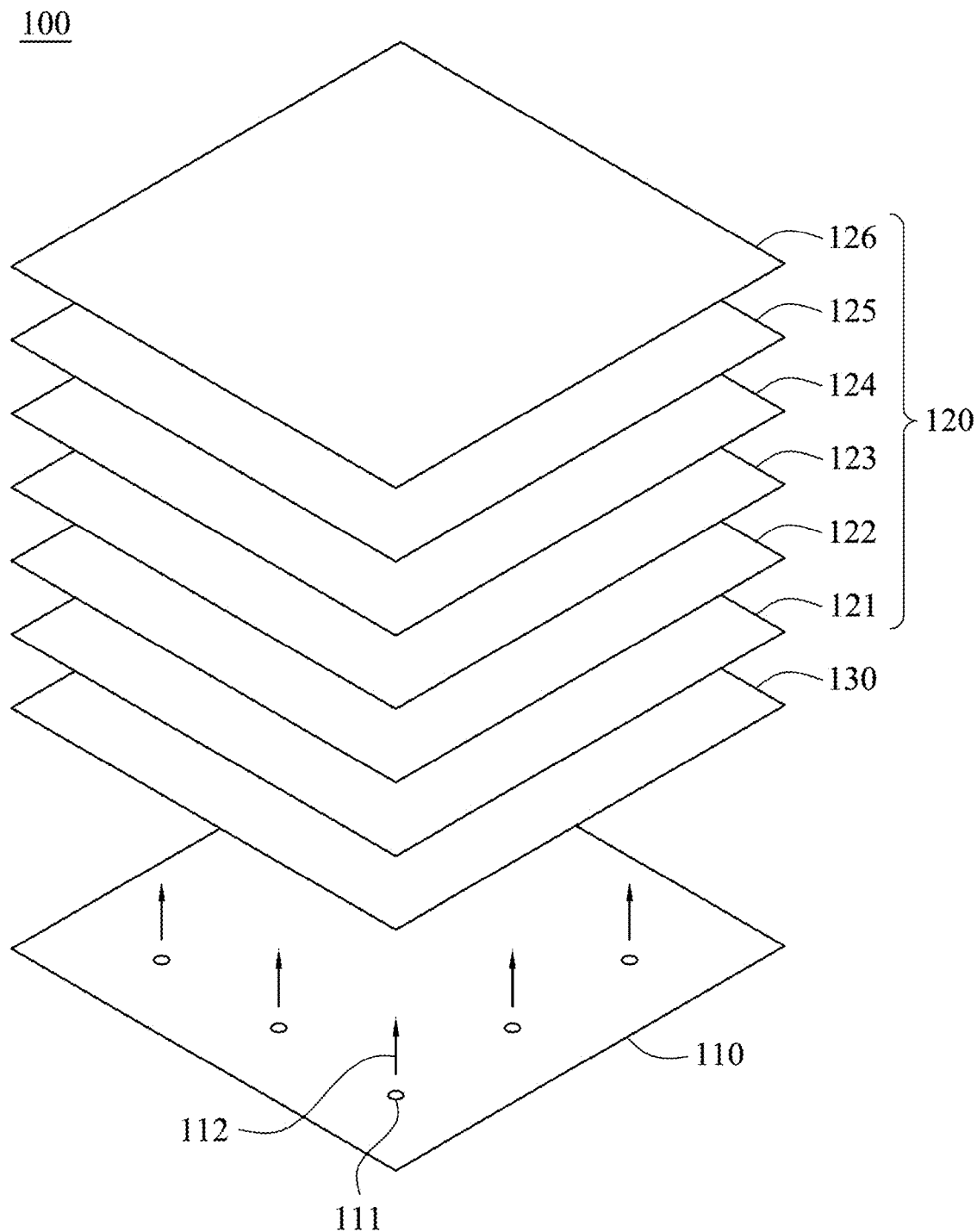
FIG. 1A is a schematic diagram of partial components of a display device in accordance with an embodiment.

FIG. 1A is a schematic diagram of partial components of a display device in accordance with an embodiment. Referring to FIG. 1A, a display device 100 includes a light source 110, a light control film 130, and an optical assembly 120. Not all components of the display device 100 are shown for simplicity. For example, the display device 100 may further include a liquid crystal panel, etc.

The light source 110 includes multiple light emitting diodes (LEDs) (e.g. LED 111) with a light emitting direction 112 toward the optical assembly 120. The size of the LED 111 may be at millimeter level, micrometer level or nanometer level. In some embodiments, the LED 111 is a mini LED which size is in a range from 75 micrometers to 300 micrometers, and the mini LED includes a sapphire substrate. In other words, the light source 110 emits blue light in some embodiments.

The light control film 130 is disposed between the light source 110 and the optical assembly 120. The LED used as the light source usually produces a Lambertian light field distribution, and a light-emitting surface will have uneven brightness with a relatively small pitch ratio between high light intensity areas. Moreover, each solid-state light source in the array is visible to the observer that may be undesirable in some situations. In some embodiments, the light control film 130 is configured to change the light field distribution of the light source 110. In particular, the light control film 130 can be configured to change the Lambertian light field distribution of the incident light from the light source 110 into a batwing-like distribution. The light control film 130 is used to provide a uniform light source in four directions: up, down, left, and right. When the mini LED is used as a backlight source, the light is collimated to be easily concentrated in the central spot, causing obvious uneven brightness. The usage of the light control film 130 can reduce the brightness of the central spot. In some embodiments, the light control film 130 is integrated into the light source 110.

The optical assembly 120 is configured to provide white light to upper components (e.g. the liquid crystal panel). In some embodiments, the optical assembly 120 includes optical films 121-126 which may include a prism layer, a diffusion layer, a light guide plate, a color conversion layer, a filter, etc. and the arrangements thereof is not limited in the disclosure.

In the embodiment, the optical films 121 and 122 are configured to provide a flat-field beam. The optical film 123 has two-dimensional microstructures. For example, the optical film 123 includes a substrate with the two-dimensional microstructures, and multiple diffusion particles are distributed in the two-dimensional microstructures. The optical film 123 provides cone-shape light to illuminate uniformly in all radial directions to achieve uniform illumination on a flat surface. Because the light from the mini LED is collimated, the light is easily concentrated in the central bright spot. The optical film 123 can reduce uneven brightness.

Figure 1B:
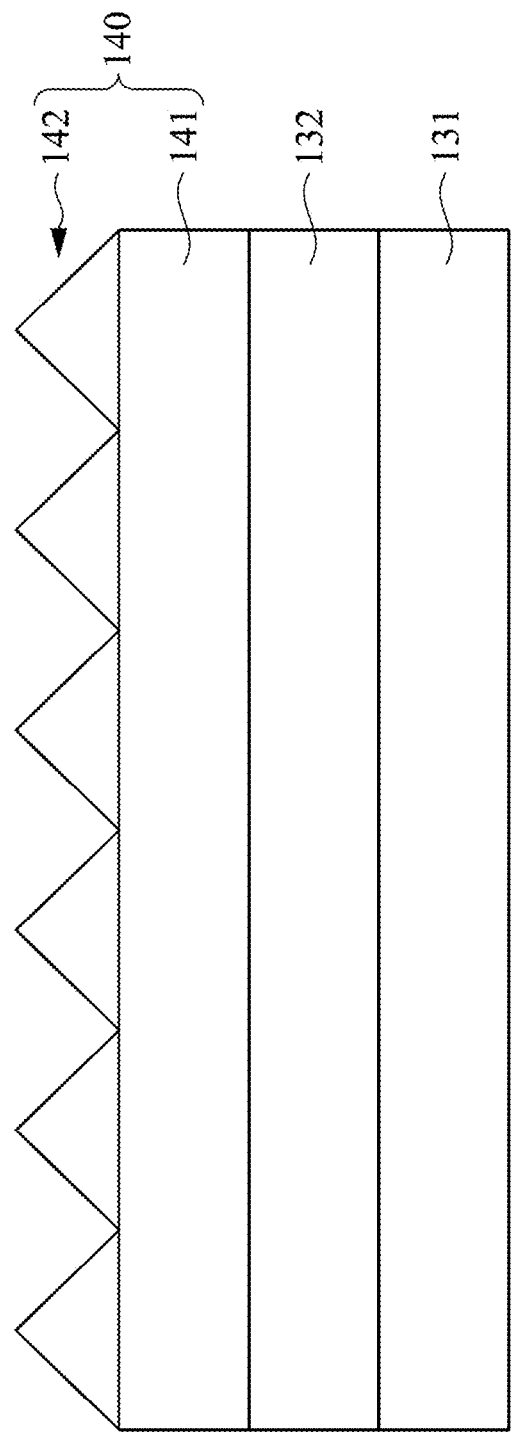
FIG. 1B is a cross-sectional view of an optical film 124 in accordance with an embodiment.

The optical film 124 has two-dimensional microstructures and includes phosphorescent particles for transforming the blue light into white light. FIG. 1B is a cross-sectional view of the optical film 124 in accordance with an embodiment. Referring to FIG. 1B, the optical film 124 includes a blue light filter 131, a color conversion layer 132, and a film 140. The color conversion layer 132 is disposed between the blue light filter 131 and the film 140. The thickness of the blue light filter 131 is, for example, 55 micrometers to block yellow light (i.e. composed of red light and green light). The thickness of the color conversion layer 132 is, for example, 60 micrometers. The color conversion layer 132 includes the phosphorescent particles for transforming the blue light into the white light. The film 140 includes a substrate 141 and two-dimensional microstructures 142. The shape of the two-dimensional microstructures 142 is, for example, pyramid. The thickness of the substrate 141 is, for example, 75 micrometers. The thickness of the two-dimensional microstructures 142 is, for example, 20 micrometers. The blue light filter 131 is not disposed in the conventional technology, and therefore the light from below may contain yellow light, causing the area where the LED 111 is not turned on to be yellowed. The blue light filter 131 is disposed in the embodiment to block the yellow light, and thus the yellowing phenomenon will be reduced.

Referring to FIG. 1A, the optical film 125 is a brightness enhancement film (BEF) including one-dimensional microstructures. The optical film 126 has one-dimensional microstructures to provide functions of brightness enhancement and diffusion. In the disclosure, the description of "one-dimensional microstructure" is referred to as protruding or recessed structures on the substrate of the corresponding optical film, and these structures extend along one direction and are parallel to each other. In some embodiments, the optical assembly 120 may further include a diffusion layer disposed above the optical film 126. In the embodiment, the optical films 121 and 122 have identical microstructures, but the moire effect is prevented from happening by rotating one of the optical films 121 and 122.

Figure 2:
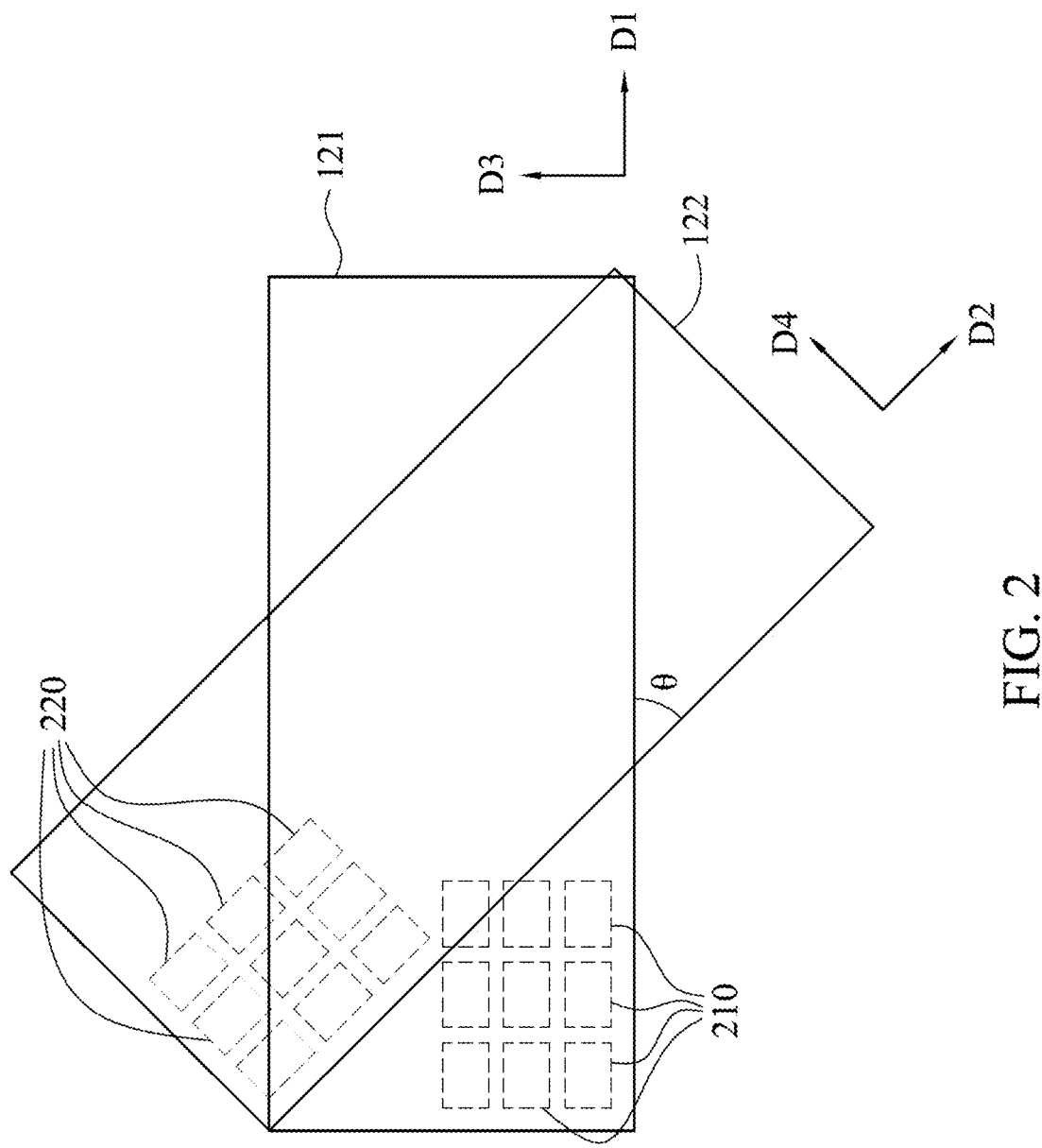
FIG. 2 is a schematic diagram of an angle between optical films in accordance with an embodiment.

FIG. 2 is a schematic diagram of an angle between optical films in accordance with an embodiment. Referring to FIG. 2, multiple first microstructures 210 are formed on the optical film 121. These first microstructures 210 are arranged along a first direction D1 and a third direction D3. The angle between the first direction D1 and the third direction D3 is, for example, 90 degrees. From another aspect, the first microstructures 210 are arranged in a chessboard arrangement based on the first direction D1. Not all first microstructures 210 are shown in FIG. 2 for simplicity. It can be said that the optical film 121 has two-dimensional microstructures in some embodiments. In the disclosure, the description of "two-dimensional microstructure" is referred to microstructures that are arranged along two directions (e.g. the first direction D1 and the third direction D3), and the angle between the two directions may be 30, 60, 90, or any suitable degrees. In other embodiments, the shape of the two-dimensional microstructures may be groove, columnar, partial spherical, partial elliptical, polygonal pyramid, cone or a combination of thereof. Multiple second microstructures 220 are formed on the optical film 122. These second microstructures 220 are arranged along a second direction D2 and a fourth direction D4. The angle between the second direction D2 and the fourth direction D4 is, for example, 90 degrees. From another aspect, the second microstructures 220 are arranged in a chessboard arrangement based on the second direction D2. Not all second microstructures 220 are shown in FIG. 2 for simplicity. Similarly, it can be said that the optical film 122 has two-dimensional microstructures.

The length of each first microstructure 210 in the first direction D1 may be less than, equal to, or longer than the length of each second microstructure 220 in the second direction D2. Moreover, the length of each first microstructure 210 in the third direction D3 may be less than, equal to, or longer than the length of each second microstructure 220 in the fourth direction D4.

In the embodiment, the optical film 122 rotates clockwise by an angle θ, and therefore the angle between the first direction D1 and the second direction D2 is θ degree. Accordingly, moire effect will not occur between the first microstructures 210 and the second microstructures 220. In some embodiments, the angle θ is greater than or equal to 30 degrees and less than or equal to 60 degrees. The above optical film 122 is rotated in the embodiment, but the below optical film 121 may be rotated in other embodiments. After one optical film is rotated, the optical films 121 and 122 may be cut to fit the shape of the display device 100.

Figure 3:
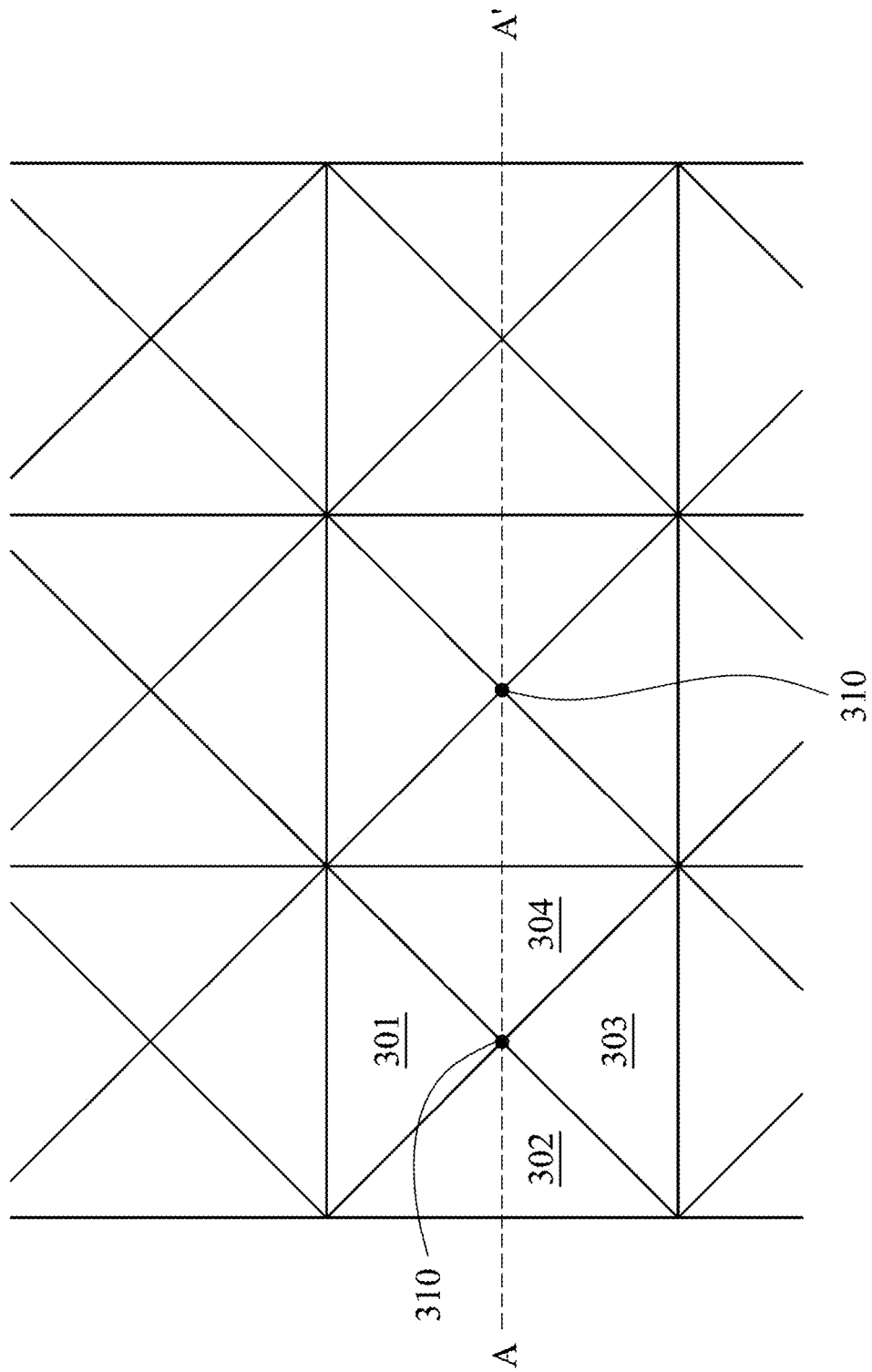
FIG. 3 is a top view of two-dimensional microstructures in accordance with an embodiment.
Figure 4:
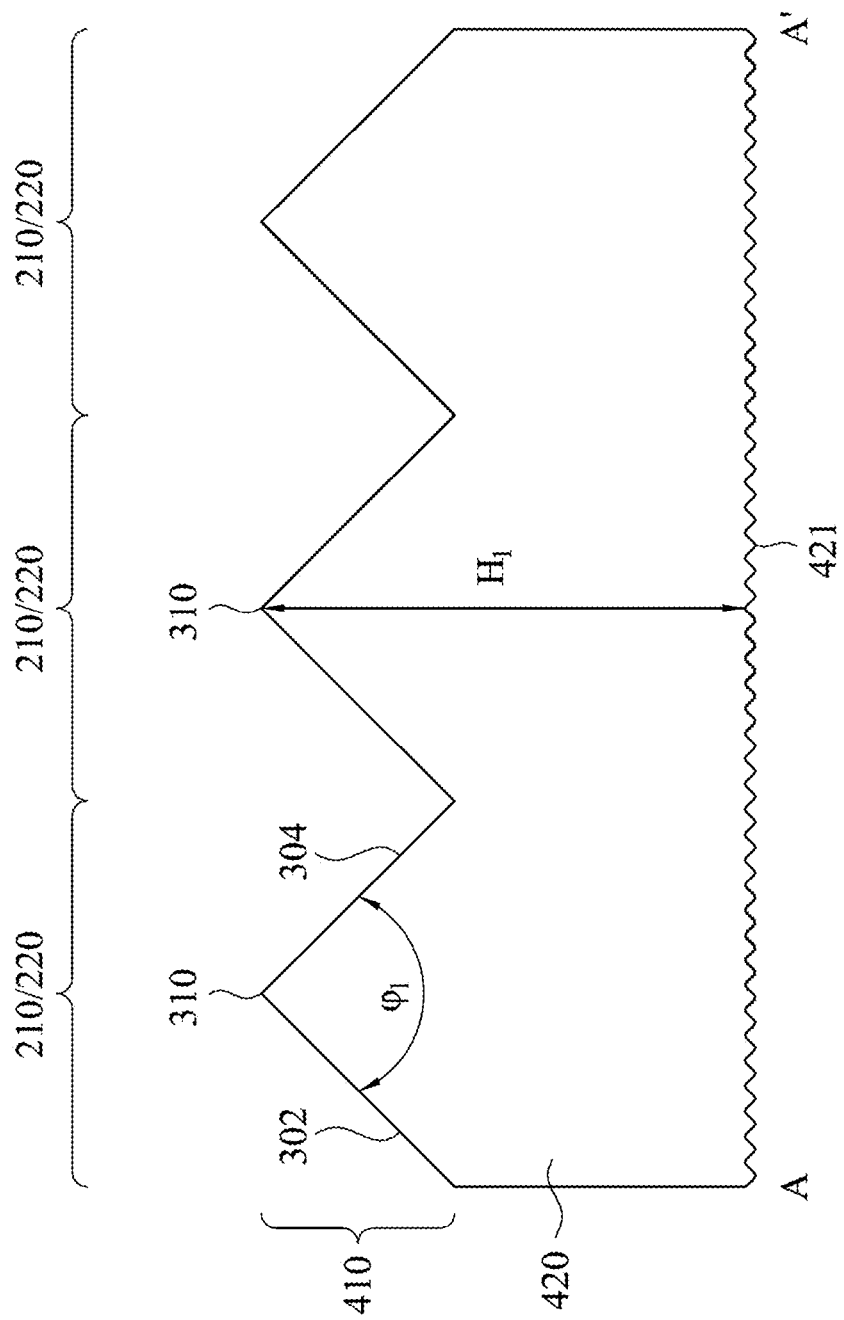
FIG. 4 is a cross-sectional view of the two-dimensional microstructures along a cross-sectional line AA' of FIG. 3 in accordance with an embodiment.

FIG. 3 is a top view of two-dimensional microstructures in accordance with an embodiment. FIG. 4 is a cross-sectional view of the two-dimensional microstructures along a cross-sectional line AA' of FIG. 3 in accordance with an embodiment. Referring to FIG. 3 and FIG. 4, each first microstructure 210 includes a protruding structure 410 formed on a substrate 420 and protruding from the substrate 420. Each protruding structure 410 includes four inclined surfaces 301-304 and one top point 310. An angle $\varphi_1$ (e.g. equal to 90 degrees) is formed between two opposite inclined surfaces 302 and 304. The angle $\varphi_1$ is also formed between the inclined surfaces 301 and 303 but is not shown for simplicity. The shape of the microstructure 210 is pyramid in the embodiment. The height $H_1$ measured from a lower surface 421 of the substrate 420 to the top point 310 is 110 micrometers which is not limited in the disclosure. In some embodiments, the first microstructure 210 may have a top round corner instead of the top point 310.

In the embodiment, the second microstructure 220 is identical to the first microstructure. In other words, the angle $\varphi_1$ of the second microstructure 220 is equal to the angle $\varphi_1$ of the first microstructure 210. From another aspect, a first height $H_1$ of the protruding structure 410 plus the substrate 420 of the first optical film 121 is equal to a second height $H_1$ of the protruding structure 410 and the substrate 420 of the second optical film 122.

Figure 5:
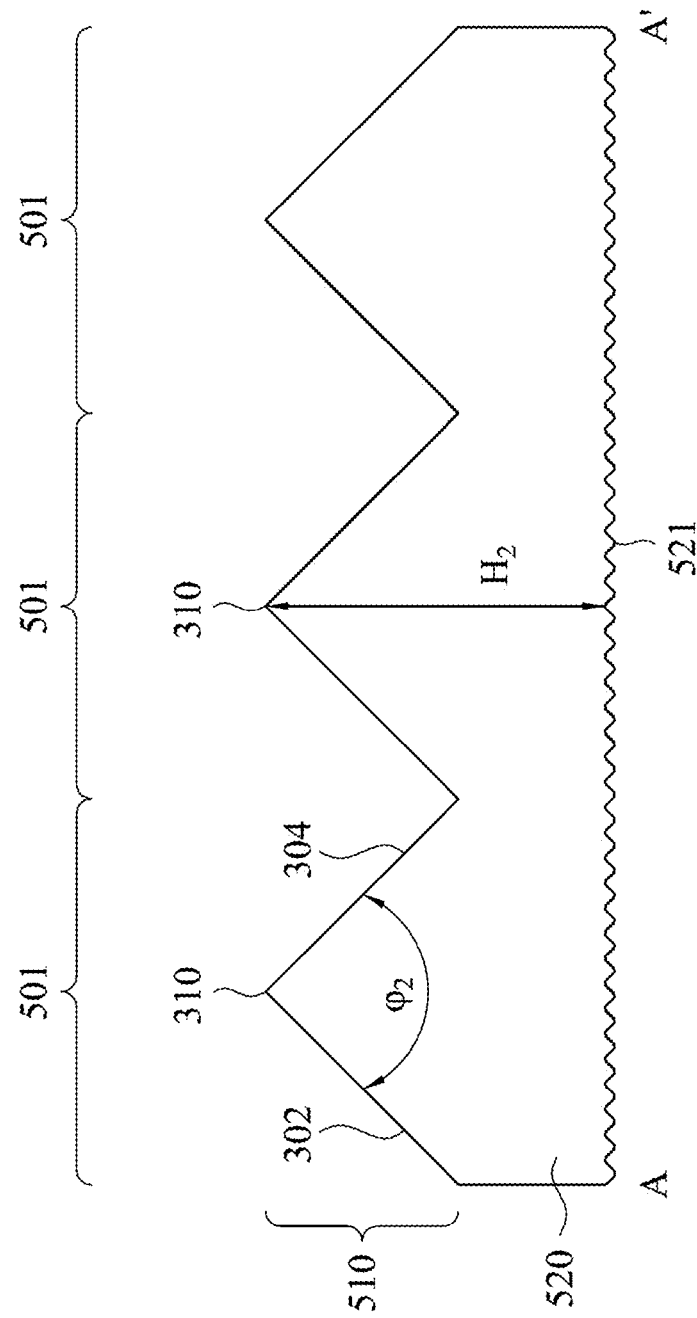
FIG. 5 is a cross-sectional view of two-dimensional microstructures of a third optical film 123 in accordance with an embodiment.

FIG. 5 is a cross-sectional view of two-dimensional microstructures of a third optical film 123 in accordance with an embodiment. The top view of the two-dimensional microstructures of the third optical film 123 is identical to that of the first optical film 121 and the second optical film 122, and therefore the top view will not be repeatedly illustrated. Referring to FIG. 3 and FIG. 5, the third optical film 123 includes microstructures 501. Each microstructure 501 includes a protruding structure 510 formed on a substrate 520 and protruding from the substrate 520. The protruding structure 510 has four inclined surfaces 301-304 and one top point 310. An angle $\varphi_2$ is formed between two opposite inclined surfaces 302 and 304. The angle $\varphi_2$ is also formed between the inclined surfaces 301 and 303. Note that the angle $\varphi_2$ of the microstructure 501 is equal to the angle $\varphi_1$ of the microstructures 210 and 220. However, a height $H_2$ measured from a lower surface 521 of the substrate 520 to the top point 310 is equal to 99 micrometers. From another aspect, the height $H_2$ of the protruding structure 510 plus the substrate 520 is less than the height $H_1$ of the microstructures 210 and 220. In other embodiments, the height $H_2$ may be equal to or greater than the height $H_1$. In some embodiments, each microstructure 501 has a top round corner instead of the top point 310. In some embodiments, multiple diffuser particles are formed in the substrate 520 and the protruding structure 510.

Referring to FIG. 2, one of the optical film 121 and the optical film 122 is taken as a reference (also referred to as a first optical film) and the other one is rotated. In some embodiments, the optical films 123-126 may be rotated when first optical film is taken as the reference. To be specific, the angle between the optical film 123 and the first optical film is equal to 0 degree; the angle between the optical film 124 and the first optical film is equal to 45 degrees; the angle between the optical film 125 and the first optical film is equal to 105 degrees; and the angle between the optical film 126 and the first optical film is equal to 15 degrees. However, the values of the degrees are merely examples and are not limited in the disclosure. In some embodiments, the first direction D1 is also a horizontal direction of the display device 100, and therefore the angle between the optical film 121 and the horizontal direction of the display device 100 is equal to 0 degree, and the angle between the optical film 122 and the horizontal direction of the display device 100 is θ degrees. In some embodiments, the angle between the first optical film and the horizontal direction of the display device 100 is greater than or equal to 0 degree and less than or equal to 45 degrees.

Figure 6A:
FIG. 6A is a schematic diagram illustrating the mura defect.
Figure 6B:
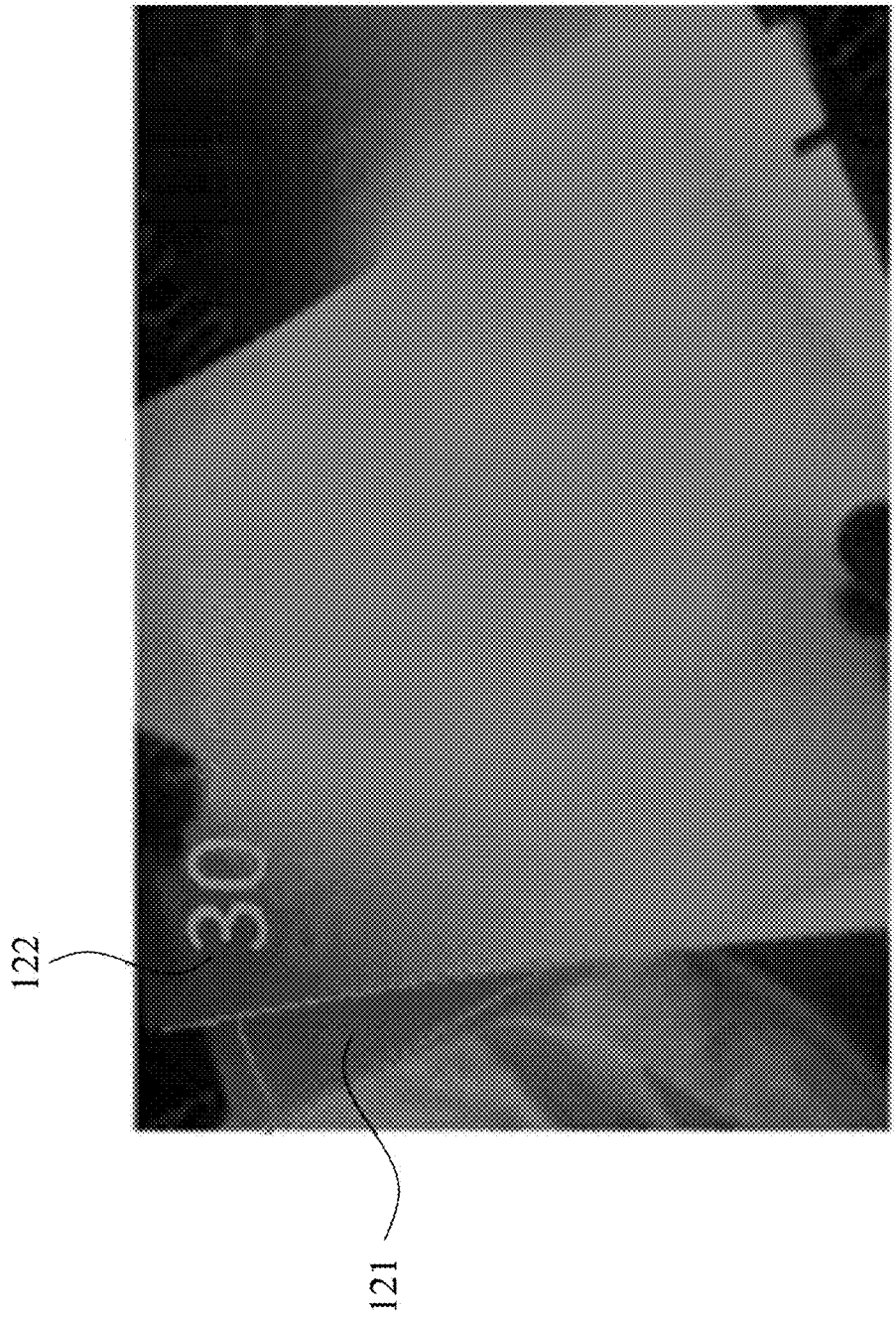
FIG. 6B is a top view of the optical assembly in accordance with an embodiment.

FIG. 6A is a schematic diagram illustrating the mura defect. FIG. 6B is a top view of the optical assembly in accordance with an embodiment. Referring to FIG. 6A, when the angle between two optical films is equal to 0 degree, the moire pattern occurs. Referring to FIG. 6B, although the optical film 121 and the optical film 122 have similar microstructures, the mura defect does not occur because the angle between the optical film 121 and the optical film 122 is 30 to 60 degrees.

Figure 7A:
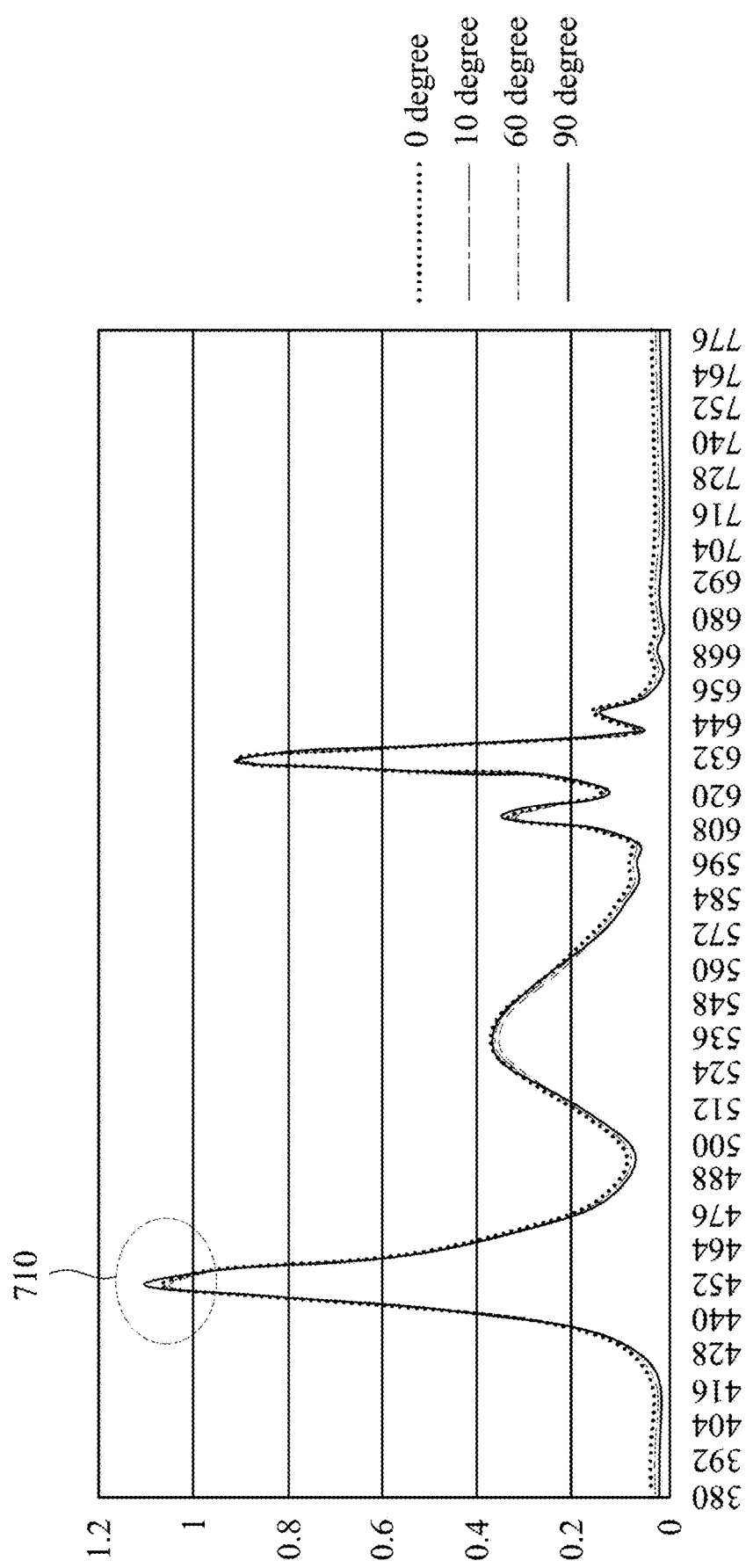
FIG. 7A is a diagram of light intensity curves with respect to wavelengths when an optical film is rotated at different angles in accordance with an embodiment.

FIG. 7A is a diagram of light intensity curves with respect to wavelengths when an optical film is rotated at different angles in accordance with an embodiment. Referring to FIG. 7A, the horizontal axis represents the wavelength of the light, and the vertical axis represents the intensity of the light passing through the optical assembly 120. In this diagram, the angle between the optical film 121 and the optical film 122 can be 0, 10, 60, and 90 degrees that correspond to four curves respectively. Note that the intensity of 90 degrees is obviously greater than that of other degrees at a peak 710. Accordingly, the rotation of 90 degrees changes the relationship between the light intensity and the wavelength. Using 90 degrees is avoided in the embodiment.

Figure 7B:
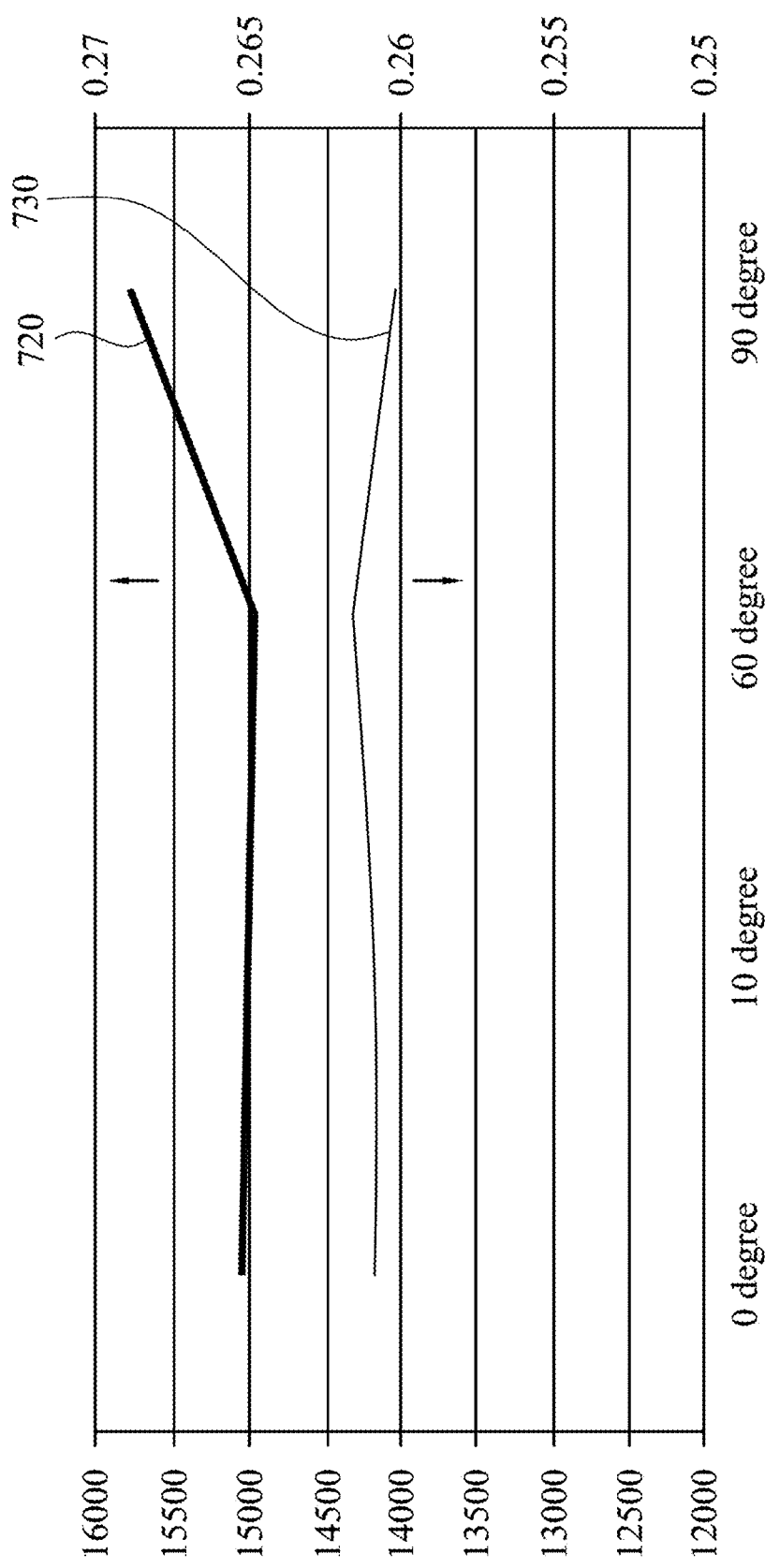
FIG. 7B is a diagram of luminance and chrominance curves with respect to different rotation angles in accordance with an embodiment.

FIG. 7B is a diagram of luminance and chrominance curves with respect to different rotation angles in accordance with an embodiment. Referring to FIG. 7B, the horizontal axis represents the angle between the optical film 121 and the optical film 122; the left vertical axis represents luminance corresponding to a curve 720; and the right vertical axis represents y component of CIE 1931 color space that corresponds to a curve 730. It is shown in FIG. 7B that when the angle between the optical film 121 and the optical film 122 is greater than 60 degrees, the luminance or chrominance (i.e. y component) begins to change. Accordingly, using degrees greater than 60 is avoided in the embodiment.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical assembly comprising:
    a first optical film having a plurality of first microstructures, wherein the first microstructures are arranged in a chessboard arrangement based on a first direction; and
    a second optical film having a plurality of second microstructures, wherein the second microstructures are arranged in the chessboard arrangement based on a second direction, and an angle between the first direction and the second direction is greater than or equal to 30 degrees and less than or equal to 60 degrees.

2. The optical assembly of claim 1, wherein each of the first microstructures has a first protruding structure, and a first angle is formed between two inclined surfaces of the first protruding structure,
    wherein each of the second microstructures has a second protruding structure, a second angle is formed between two inclined surfaces of the second protruding structure, and the second angle is equal to the first angle.

3. The optical assembly of claim 2, wherein the first optical film comprises a first substrate, the first protruding structure is formed on the first substrate, the second optical film comprises a second substrate, the second protruding structure is formed on the second substrate, a first height of the first protruding structure plus the first substrate is equal to a second height of the second protruding structure plus the second substrate.

4. The optical assembly of claim 3, further comprising:
    a third optical film disposed above the second optical film, wherein an angle between the third optical film and the first optical film is equal to 0 degree;
    a fourth optical film disposed above the third optical film, wherein an angle between the fourth optical film and the first optical film is equal to 45 degrees;
    a fifth optical film disposed above the fourth optical film, wherein an angle between the fifth optical film and the first optical film is equal to 105 degrees; and
    a sixth optical film disposed above the fifth optical film, wherein an angle between the sixth optical film and the first optical film is equal to 15 degrees.

5. The optical assembly of claim 4, wherein the fourth optical film comprises:
    a blue light filter; and
    a color conversion layer comprising phosphorescent particles, wherein the color conversion layer is disposed above the blue light filter.

6. The optical assembly of claim 5, wherein the fourth optical film further comprises a film having a substrate and a two-dimensional microstructure, and the color conversion layer is disposed between the blue light filter and the film.

7. The optical assembly of claim 4, wherein the third optical film comprises a third protruding structure and a third substrate, the third protruding structure is formed on the third substrate, a third height of the third protruding structure plus the third substrate is less than the first height.

8. A display device comprising:
    a light source; and
    an optical assembly comprising:
        a first optical film having a plurality of first microstructures, wherein the first microstructures are arranged in a chessboard arrangement based on a first direction; and
        a second optical film having a plurality of second microstructures, wherein the second microstructures are arranged in the chessboard arrangement based on a second direction, and an angle between the first direction and the second direction is greater than or equal to 30 degrees and less than or equal to 60 degrees.

9. The display device of claim 8, wherein the light source comprises a plurality of light emitting diodes with a light emitting direction toward the optical assembly.

10. The display device of claim 9, wherein a size of the light emitting diodes is in a range from 75 micrometers to 300 micrometers, and the light emitting diodes comprise a sapphire substrate.

11. The display device of claim 9, further comprising a light control film disposed between the light source and the optical assembly.

12. The display device of claim 8, wherein each of the first microstructures has a first protruding structure, and a first angle is formed between two inclined surfaces of the first protruding structure,
    wherein each of the second microstructures has a second protruding structure, a second angle is formed between two inclined surfaces of the second protruding structure, and the second angle is equal to the first angle.

13. The display device of claim 12, wherein the first optical film comprises a first substrate, the first protruding structure is formed on the first substrate, the second optical film comprises a second substrate, the second protruding structure is formed on the second substrate, a first height of the first protruding structure plus the first substrate is equal to a second height of the second protruding structure plus the second substrate.

14. The display device of claim 13, wherein the optical assembly further comprises:
    a third optical film disposed above the second optical film, wherein an angle between the third optical film and the first optical film is equal to 0 degree;
    a fourth optical film disposed above the third optical film, wherein an angle between the fourth optical film and the first optical film is equal to 45 degrees;
    a fifth optical film disposed above the fourth optical film, wherein an angle between the fifth optical film and the first optical film is equal to 105 degrees; and
    a sixth optical film disposed above the fifth optical film, wherein an angle between the sixth optical film and the first optical film is equal to 15 degrees.

15. The display device of claim 14, wherein the fourth optical film comprises:
    a blue light filter; and
    a color conversion layer comprising phosphorescent particles, wherein the color conversion layer is disposed above the blue light filter.

16. The display device of claim 15, wherein the fourth optical film further comprises a film having a substrate and a two-dimensional microstructure, and the color conversion layer is disposed between the blue light filter and the film.

17. The display device of claim 14, wherein the third optical film comprises a third protruding structure and a third substrate, the third protruding structure is formed on the third substrate, a third height of the third protruding structure plus the third substrate is less than the first height.

18. The display device of claim 8, wherein an angle between the first optical film and a horizontal direction of the display device is greater than 0 degree and less than or equal to 45 degrees.

* * * * *